J. H. O'BRIEN.
FIRE SHUTTER FOR MOVING PICTURE MACHINES.
APPLICATION FILED FEB. 27, 1920.
1,423,139.
Patented July 18, 1922.
2 SHEETS—SHEET 1.
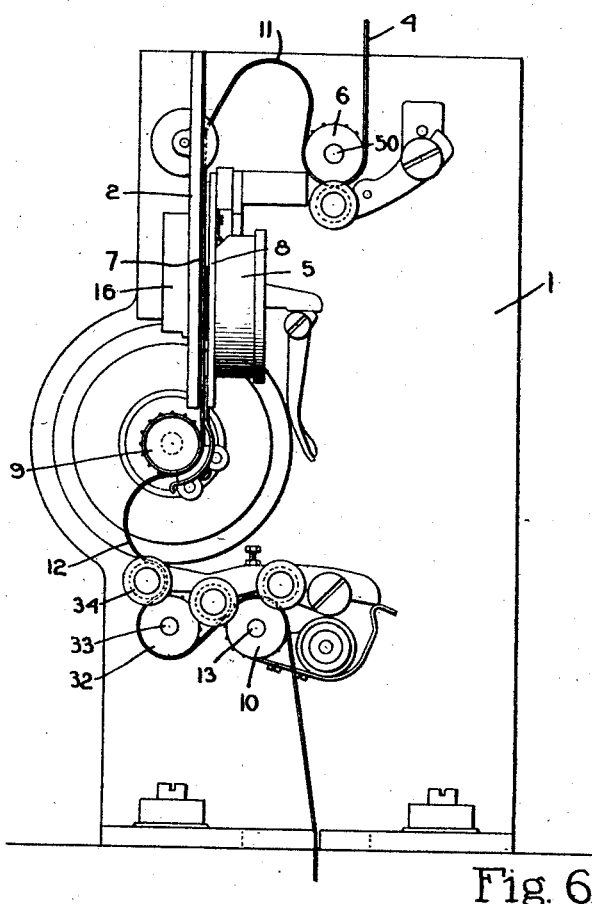
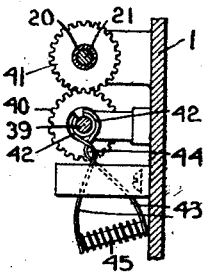
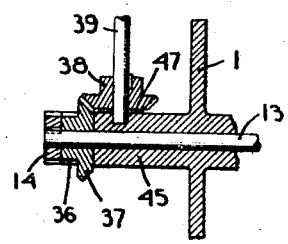
Inventor.
James H. O'Brien
by Heard Smith & Tennant.
Attys.

J. H. O'BRIEN.
FIRE SHUTTER FOR MOVING PICTURE MACHINES.
APPLICATION FILED FEB. 27, 1920.

1,423,139.

Patented July 18, 1922.
2 SHEETS—SHEET 2.

Inventor.
James H. O'Brien
by Heard Smith & Tennant.
Attys.

UNITED STATES PATENT OFFICE.

JAMES H. O'BRIEN, OF MANCHESTER, NEW HAMPSHIRE.

FIRE SHUTTER FOR MOVING-PICTURE MACHINES.

1,423,139.      Specification of Letters Patent.      Patented July 18, 1922.

Application filed February 27, 1920. Serial No. 361,904.

*To all whom it may concern:*

Be it known that I, JAMES H. O'BRIEN, a citizen of the United States, residing at Manchester, county of Hillsborough, State of New Hampshire, have invented an Improvement in Fire Shutters for Moving-Picture Machines, of which the following description, in connection with the accompanying drawing, is a specification, like characters on the drawing representing like parts.

This invention relates to moving picture machines and particularly to the so-called fire shutter thereof.

The films usually used in moving picture machines are made of highly-inflammable material so that if the film remains stationary in the beam of light for any appreciable length of time, there is danger that the heat from the light rays will ignite the film. Accordingly it has been common practice to provide moving picture machines with a shutter commonly referred to as a fire shutter which is connected to the mechanism for feeding the film and is arranged so that when the mechanism is at rest, the shutter will automatically move into a position to protect the film from the beam of light, while when the mechanism is operating to feed the film, the shutter will be moved into its inoperative position out of the beam of light thereby permitting said beam to be projected through the film.

There are some disadvantages resulting from controlling the fire shutter by the operating mechanism for the film. If, for instance, the film should break at a point between the aperture and the intermittent feed, the portion of the film in the path of the beam of light would remain stationary, and if the actuating mechanism were continued in operation, the shutter would be held open thereby exposing the stationary broken end of the film to the heat of the rays from the lamp which would probably result in igniting the film. Then again, it sometimes happens that the holes in the film become worn to such an extent that they do not hold properly on the intermittent feed sprocket with the result that said sprocket will slip thereby either retarding the speed at which the film is advanced across the beam of light, or allowing the film to remain stationary. In either event, the retardation of the film may be such as to render it liable to become ignited from the heat of the light rays. Under these conditions, if the shutter is actuated by the operating mechanism, it will remain open notwithstanding that the film is moving slower or has come to rest because the operating mechanism is still in full operation.

The principal object of my invention is to provide a novel fire shutter and actuating mechanism therefor which is controlled entirely by the speed of movement of the film and not by the actuating mechanism for the film. My improved shutter is so arranged that so long as the film is moving at a sufficient speed to eliminate all danger that it will become ignited from the heat of the lamp, the shutter will remain open, but if the speed of the film decreases to the point where there is danger that the film will become ignited, the shutter will automatically close and cut off the light rays from the film. Since my shutter is actuated entirely by the speed of the film and not by the mechanism which operates the film, any retardation of the speed of the film to the danger point will result in closing the shutter, whether said retardation is due to a break in the film or to slippage of the intermittent sprocket, or from any other cause, and regardless of whether the actuating mechanism continues in operation or not.

In order to give an understanding of my invention, I have illustrated in the drawings a selected embodiment thereof which will now be described, after which the novel features will be pointed out in the appended claims.

In the drawings, Fig. 1 is a side view of a portion of a moving picture machine having my improvements applied thereto;

Fig. 5 is a section on the line 5—5, Fig. 2;

Fig. 6 is a top plan view of the brake mechanism.

Figure 2:
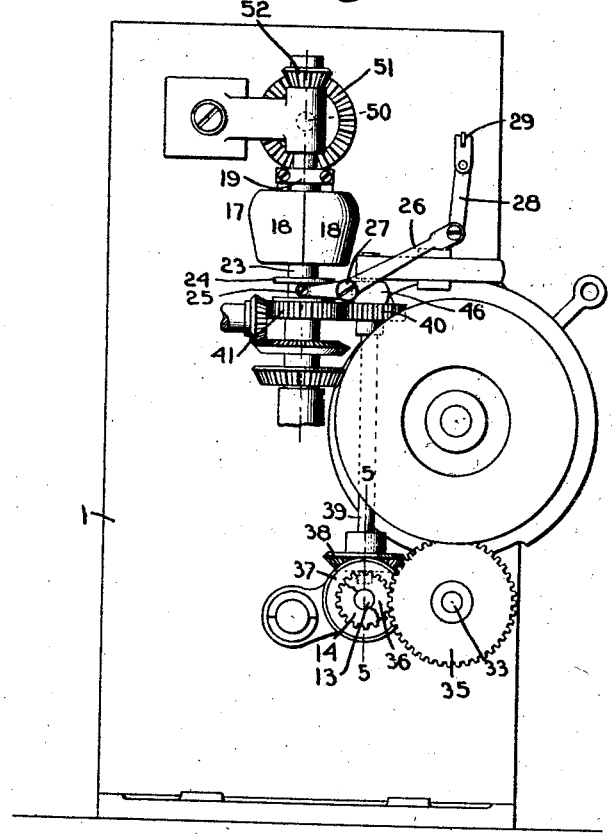
Fig. 2 shows the opposite side from that shown in Fig. 1.

Inasmuch as my invention relates simply to the fire shutter and its actuating mechanism, I have not deemed it necessary to illustrate in the drawings a complete moving picture machine, but have confined the illustration to such parts as are necessary to give a proper understanding of the construction and operation of my improved fire shutter.

Figure 3:
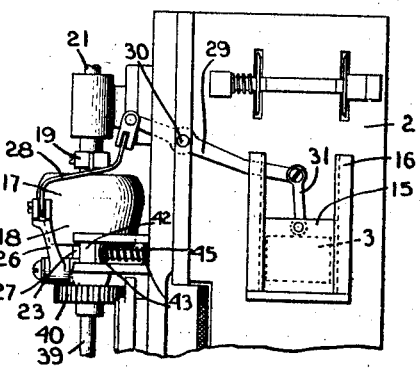
Fig. 3 is a front view of the fire shutter and its connections to the governor.

In the drawings, 1 indicates the main frame on which the operative parts of the machine are mounted. This frame is in the form of a vertical plate and it has at its upper end a lateral extension 2 which is provided with an opening 3 shown in dotted lines Fig. 3, through which the beam of light is projected from the lamp onto the film strip indicated generally at 4. Situated in the rear of this opening 3 is a holder 5 to which the usual lenses are secured, and the film strip 4 is arranged to pass down between the extension 2 and the lenses, as usual in moving picture machines. The film strip is taken from a supply reel (not shown) and passes around the usual feed sprocket 6 which is constantly driven, and from the feed sprocket passes into the trackway 7 between the frame extension 2 and guide plate 8, said film passing across the aperture 3 and thence passing to an intermittently-actuated feed sprocket 9 situated beneath the frame extension 2. This sprocket 9 is given an intermittent or step-by-step feed movement as usual in motion picture machines so that the film is moved across the opening 3 with an intermittent or step-by-step movement. From the intermittent feed sprocket 9, the film passes to a constantly-driven take-up sprocket 10 from which it is delivered to the other reel, not shown. The film strip is fed into the machine so that there will be a loop 11 between the feed sprocket and the film track 7 and another loop 12 between the intermittent sprocket and the take-up sprocket 10. The take-up sprocket 10 is made fast on a shaft 13 which extends through the plate 1 and has on its opposite end a driving gear 14 by which it is rotated, said gear being actuated in any suitable or usual way.

The feed sprocket 6 is fast on a shaft 50 which extends transversely through the supporting plate 1 and is provided on its other end with a bevel gear 51 meshing with a bevel gear 52 fast on a driving shaft 21 which may be rotated in any usual way.

The parts thus far described are or may be all as usual in motion picture machines and constitute no part of my present invention, and, therefore, I do not regard it as necessary to further describe or illustrate them.

It is customary to provide motion picture machines of this type with a fire shutter 15 which is placed on the opposite side of the extension 2 from the film and which is vertically movable in guideways 16 and is adapted in different positions to open and close the opening 3. As stated above, my invention has for its object to provide a novel mechanism for actuating this shutter which is controlled by the film itself and not by the feed sprocket, take-up sprocket, or other actuating mechanism for the film, so that the shutter will be held opened so long as the film is moving at a proper rate of speed, but will be automatically closed in the position shown in Fig. 3 if the speed of the film falls below a predetermined point.

Figure 4:
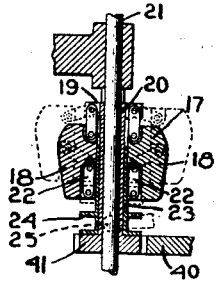
Fig. 4 is a vertical sectional view through the governor.

I provide for this by connecting the film to a centrifugal governor which is driven directly from the film. The governor for controlling the shutter is indicated at 17, and it is of the usual centrifugal type comprising two weights 18 which are connected at their upper ends to a collar 19 fast on a sleeve 20 that is loosely mounted on the driving shaft 21 for the feed sprocket. The lower ends of the weights are connected by links 22 to a second sleeve 23 which fits loosely over the sleeve 20 and is provided at its lower end with a grooved collar 24 in the groove of which is received a roll 25 on a lever 26 pivoted to the frame at 27. This lever 27 is connected at its outer end by a connection 28 to one end of a lever 29 which is pivoted to the frame at 30, and the other end of which is pivotally connected to the shutter by means of a link 31. The connections thus described are such that so long as the centrifugal governor is stationary, or so long as the weights 18 are in their normal position illustrated in Fig. 4, the shutter will remain closed, but if the governor is rotated at sufficient speed to throw the weights outwardly into the dotted line position Fig. 4, then the sleeve 23 will be raised thereby rocking the lever 26 and raising the shutter 15.

I have herein provided means actuated directly by the film for operating the governor, and I will preferably employ the portion of the film adjacent the take-up roll 10 for actuating the governor, although the governor might be operated from any portion of the film without departing from my invention.

In the selected embodiment of the invention I provide a governor-actuating sprocket 32 which is fast on a shaft 33 that is journaled in the frame and extends through the plate 1, said sprocket 32 being situated adjacent the take-up sprocket 10 and between the latter and the intermittent sprocket 9, so that the film will pass over the governor-actuating sprocket 32 in its passage from the intermittent sprocket 9 to the take-up sprocket 10. The film is held in contact with the governor-actuating sprocket 32 by means of a guide roll 34, and as herein shown, the film from the loop 12 passes between the guide roll 34 and the sprocket 32, then around said sprocket 32, and from said sprocket to the take-up sprocket 10. The film is thus firmly held in contact with the sprocket 32 with the result that said sprocket will be driven by the moving film as it is fed forward by the take-up sprocket 10. The shaft 33 extends through the plate 1 and is provided at its other end with a gear 35 which meshes with and drives a gear 36 loosely mounted on the shaft 13 for the take-up sprocket 10. This gear 36 is shown as being rigid with a bevel gear 37 which meshes with and drives a bevel gear 38 fast on the lower end of a vertical shaft 39. The shaft 39 has a gear 40 at its upper end which meshes with and drives a gear 41 on the sleeve 20 to which the governor is secured. The film, therefore, drives the sprocket wheel 32 and the latter operates through the shaft 33, gears 35, 36, 37, 38 to rotate the governor. The governor is, therefore, driven entirely by the film and by means entirely separate from the mechanism for actuating the film.

So long as the film is moving over the sprocket 32 at a proper rate of speed, the governor will hold the shutter 15 open, but if for any reason, the speed at which the film passes over the sprocket 32 drops below a predetermined point, the shutter will automatically close. If, therefore, the film should break at any point between the feed sprocket 6 and take-up sprocket 10, the shutter will close as soon as the broken end of the film has been carried over the sprocket 32 which will be about one-fifth of a second after the break occurs. So also if there should occur any slippage between the intermittent sprocket 9 and the film thereby retarding the speed of the film to the danger point, the consequent retardation of the governor would result in closing the shutter and preventing any danger of the film igniting.

It is desirable that the shutter should close the instant that the speed of the film reaches the danger point, and in order to prevent the momentum of the governor from continuing its rotation after the film ceases to drive it, I have provided a brake mechanism for the governor-rotating means which overcomes this momentum and brings the governor to rest as soon as the driving power ceases. The brake herein shown comprises two brake jaws 42 which engage the upper end of the shaft 39. Said jaws are carried by arms 43 that are pivotally connected at 44 and are acted upon by a spring 45 tending to hold the brake jaws in frictional engagement with the upper end of the shaft. These brake jaws provide sufficient braking effect on the governor-rotating mechanism to bring the governor to rest as soon as the driving power ceases.

The shaft 39 may be journaled in any suitable bearings. I have herein shown the lower end of it as journaled in an aperture formed in the bearing 145 for the shaft 13, and the upper end as journaled in a bracket arm 46 which is secured to the frame 1. 47 indicates a bearing washer situated between the bevel gear 39 and the bearing.

I have herein illustrated and described one embodiment of my invention for actuating the shutter directly from the film, but I do not wish to be limited to the constructional features shown.

I claim:

1. In a moving-picture machine, the combination with film-actuating mechanism for feeding the film, of a fire shutter, a centrifugal governor for controlling the shutter, governor-rotating means actuated directly and positively by the film, and means to apply continuously a braking action on the governor-rotating means sufficient to overcome the momentum of the governor and bring it to rest promptly when the governor-rotating means suddenly ceases to act, but insufficient to affect the action of said means normally.

2. In a moving-picture machine, the combination with an intermittently-actuated film-feeding sprocket, of a take-up sprocket, a positively-driven shaft for rotating said take-up sprocket, a film-driven sprocket situated between the intermittent sprocket and the take-up sprocket, a gear loosely mounted on said shaft, means to rotate said gear from the film-driven sprocket, a fire shutter, a governor for controlling said shutter, and means for actuating said governor from said gear.

3. In a moving-picture apparatus, the combination with means for feeding a film including a feed sprocket, an intermittently-actuated sprocket, and a take-up sprocket, of a shaft connected to the feed sprocket for actuating the latter, a sleeve loosely mounted on said shaft, a governor carried by said sleeve, a fire shutter controlled by the governor, and film-actuated means to rotate the governor.

4. In a moving-picture apparatus, the combination with means for feeding a film including a feed sprocket, an intermittently-actuated sprocket, and a take-up sprocket, of a shaft connected to the feed sprocket for actuating the latter, a sleeve loosely mounted on said shaft, a governor carried by said sleeve, a fire shutter controlled by the governor, a film-driven sprocket engaging the film between the intermittent sprocket and the take-up sprocket, and driving connections between said film-driven sprocket and the governor.

5. In a moving-picture machine, the combination with an intermittently-actuated film-feeding sprocket, of a take-up sprocket, a positively-driven shaft for rotating said take-up sprocket, a film-driven sprocket situated between the intermittent sprocket and the take-up sprocket, a gear loosely mounted on said shaft, means to rotate said gear from the film-driven sprocket, a fire shutter, a governor for controlling said shutter, driving connections between said gear and said governor and a device applying constantly braking pressure to said driving connections.

In testimony whereof, I have signed my name to this specification.

JAMES H. O'BRIEN.